United States Patent [19]

Spellane et al.

[11] Patent Number: 6,120,705
[45] Date of Patent: *Sep. 19, 2000

[54] CORROSION PROTECTION OF METALS USING DIPHENYLAMINE COMPOUND(S)

[75] Inventors: Peter J. Spellane, Ardsley-on-Hudson; Edward D. Weil, New York, both of N.Y.

[73] Assignee: Polymer Alloys LLC, Ardsley-on-Hudosn, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/161,852

[22] Filed: Sep. 28, 1998

Related U.S. Application Data

[63] Continuation-in-part of application No. 08/739,766, Oct. 30, 1996, Pat. No. 5,853,462.

[51] Int. Cl.$^7$ .................................................. C23F 11/10
[52] U.S. Cl. ........................... 252/390; 252/391; 252/395; 106/14.37; 106/14.38; 427/340; 427/385.5; 428/457
[58] Field of Search ..................... 252/390, 391, 252/395; 106/14.37, 14.38; 427/340, 385.5; 428/457

[56] References Cited

U.S. PATENT DOCUMENTS 3,770,377  11/1973  Scott et al. .............................. 21/2.7 R
3,974,323  8/1976  Brouillette et al. ...................... 428/457
4,778,654  10/1988  Bacskai et al. .............................. 422/7
4,808,441  2/1989  Chattha et al. .......................... 427/386

FOREIGN PATENT DOCUMENTS 05081936  4/1993  Japan .
10158673  6/1998  Japan .

OTHER PUBLICATIONS

Chemical Abstracts, vol. 103, 13499 (1984).
Chemical Abstracts, vol. 123, 35356 (1995).

*Primary Examiner*—Margaret Medley
*Assistant Examiner*—Cephia D. Toomer

[57] ABSTRACT

A metal article is protected from corrosion under prolonged exposure to normal ambient atmospheric conditions which cause such corrosion by coating the metal article, optionally in the presence of an adherent organic resinous coating, which comprises treating the metal with an effective amount of effective amount of one or more hydrocarbyl-substituted sulfonyl amido diphenylamine compounds for the corrosion protection of the metal article. These compound(s) are of the formula p-(R—$SO_2$—NH—$C_6H_4$—NH)—$C_6H_5$, where R is a substituted or unsubstituted hydrocarbyl group selected from the group consisting of alkyl, aryl, alkaryl, aralkyl, alkenyl, and cycloalkyl. A particularly preferred compound is p-(p-toluene sulfonyl amido)-diphenylamine.

12 Claims, No Drawings

CORROSION PROTECTION OF METALS USING DIPHENYLAMINE COMPOUND(S)

This is a continuation-in-part of U.S. Ser. No. 08/739,766, filed Oct. 30, 1996, now U.S. Pat. No. 5,853,462.

BACKGROUND OF THE INVENTION

The previously referenced application, in its Background of the Invention section, which is incorporated herein in its entirety by reference, discusses various nitrogen-containing corrosion agents for metals that had been used by the prior art. That application itself discussed certain compounds containing a diphenylamine structure that could also be employed as corrosion inhibitors for metal when incorporated in an organic resinous coating.

SUMMARY OF THE INVENTION

The present invention relates to a method for the corrosion protection of a metal article under prolonged exposure to ambient atmospheric conditions by treating the metal with an effective amount of one or more hydrocarbyl-substituted sulfonyl amido diphenylamine compounds for the corrosion protection of the metal article. This is preferably accomplished by coating the metal article with an adherent organic coating that contains the selected hydrocarbyl-substituted sulfonyl amido diphenylamine compound or compounds for the desired corrosion protection action. The present invention is useful in the prevention of corrosion of metals exposed to ambient atmospheres which may include the presence of acid rain, salt spray in coastal regions, industrial pollutants (sulfur and halogen acids, for example) and other corrosion inducing components of the atmosphere. The compounds of the present invention could also be blended with or added to other redox active coating or wash coat compositions to form a combined agent anticorrosion coating.

DESCRIPTION OF THE PREFERRED EMBODIMENTS

As earlier described, the present invention relates, in one embodiment, to protecting a metal article from corrosion under prolonged exposure to ambient atmospheric conditions by treating the metal an effective amount of one or more hydrocarbyl-substituted sulfonyl amido diphenylamine compounds for the corrosion protection of the metal article. This may be done either by simply treating the metal alone with such compound(s) or treating them with an organic solvent solution of such compounds as, for example, a wash coat. However, in a preferred pretreatment embodiment the desired compound(s) are present in an adherent organic coating which both covers the metal forming a barrier coating and holds the active anticorrosion compound(s) in contact with the metal for an extended period of time.

Representative metals that can be protected by means of the present invention include any metal that will normally corrode under normal atmospheric conditions if not treated in accordance with the present invention. Examples of such metals include those that are ferrous in nature, including mild steel, which can be viewed as a "compound" metal comprising iron and a lesser amount of carbon. The term "compound metal" as used herein is intended to be synonymous with the term "alloy". Another metal that can be treated in accordance with the present invention is copper, such as used in electronic applications. Other metals that can be coated include steel alloys, aluminum, aluminum alloys, and other non-noble metals.

The coating which is preferably used to coat such a metal will contain a suitable organic component of the type previously utilized in certain coatings containing polyaniline, for example, as the corrosion protection agent. Representative types of organic components for use in forming such coatings include organic resins of the following types: epoxy resins, polyester resins, the polyimides, acrylate resins, the polyurethanes, the polyamides, vinyl resins, alkyd resins, melamine resins, and the like. Such a coating is much like the conventional paints and coatings that are used by the coatings industry to coat, decorate, and/or protect metal substrates, which are prone to environmental corrosion damage. If desired, this coating can also be topcoated for an additional level of protection.

The present invention, in a preferred embodiment, relies upon the use in such an organic coating of an effective amount (e.g., from about 0.1% to about 20%, by weight of the organic resin) of one or more hydrocarbyl-substituted sulfonyl amido diphenylamine compounds for the corrosion protection of the metal article. Representative compounds of this type have the formula

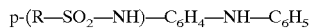

$$p\text{-}(R\text{—}SO_2\text{—}NH)\text{—}C_6H_4\text{—}NH\text{—}C_6H_5$$

where R is a substituted or unsubstituted hydrocarbyl group which can be, for example, alkyl, aryl, alkaryl, aralkyl, alkenyl, or cycloalkyl. A preferred, widely available compound for selection is p-(p-toluene sulfonyl amido)-diphenylamine that is sold under the trademark ARANOX by Uniroyal Chemical Company.

The preferred p-(p-toluene sulfonyl amido)-diphenylamine has a number of attractive advantages for use in the present invention. It is a non-staining (non-discoloring) material that might be crucially important if it is incorporated in a coating where color matters. It is toxicologically innocuous in contrast, for example, with many other members of the p-phenylenediamine family which are suspected as being carcinogens. Unlike the other p-phenylenediamines which are used in rubber tires but not in consumer-type products, p-(p-toluene sulfonyl amido)-diphenylamine is deemed to be safe enough for use in children's balloons. Finally, it is a fairly high melting solid and is chemically less reactive towards the functional groups that might be in such coating candidates as epoxies, imines, and the like. This feature may make it more attractive as a "drop in additive" in existing formulations thereby precluding the tiresome readjustment of such formulations.

The combination of organic resin and aromatic amine can be applied to the metal either neat or in a suitable organic solvent. The coating can be heat treated, if desired, for example, to enhance the functioning in the protective coating of the selected organic resin component. If desired, the coating composition can contain needed functional additives to enhance the ultimate character of the final coating including: fillers; pigments; curing agents and accelerators; and the like.

The present invention will be further understood by reference to the Examples that follow.

EXAMPLES 1–3

These Examples illustrate the formulation of a two-component urethane primer coating with no corrosion-inhibiting pigment (1), with ARANOX antioxidant (2), or with NAUGARD J antioxidant powder (3), as replacement for zinc chromate, at the same pigment volume amount.

The ARANOX and NAUGARD J brand antioxidant additives were used separately as a replacement for zinc chromate in a proprietary, pigmented two-component polyurethane, based on a proprietary acrylic polyol and cross-linked with a commercial trifunctional isocyanate, DESMODUR N-75 brand from Bayer. The formulation also comprised inert pigments and additives and organic solvents. The ARANOX solid was added to comprise 3.4% of the formulation weight. Pigment was ground into the formulation, to a Hegman grind of 6 NS or better, forming a stable gray paint. NAUGARD J powder was added to the same base formulation to comprise 3.1% of the formulation weight and ground to Hegman NS 6–7, forming a gray stable coating.

The primer coating formulations were bar-coated with a #50 wire-wound rod on an unpretreated cold rolled steel substrate, which had been cleaned with methyl ethyl ketone. The primer coats were cured at ambient temperature for one week. The coating thicknesses were 1.5 mils. Primer-coated steel samples were not topcoated but were scribed prior to corrosion testing.

EXAMPLES 4–6

These Examples provide a comparison of the corrosion resistance of two-component urethane coating formulations with no corrosion-inhibiting pigment (4), with ARANOX antioxidant pigment (5), and with NAUGARD J antioxidant pigment (6).

The samples prepared, as described above in Examples 1–3, were subject to 1000 hours salt spray (ASTM B117) and rated for rust and blistering.

| Example | pigment | CR rating | scribe area rust, inches | scribe area, blister | field area, red rust (%) | field area blister |
|---|---|---|---|---|---|---|
| 4 | no CIP | 0 | 1/64 | 2D | 30 | 2D |
| 5 | ARANOX | 6 | 1/64 | 4D | 0 | BF |
| 6 | NAUGARD J | 1 | 1/64 | 2D | 10 | 2D |

Corrosion resistance (CR) rating: 10—best; 0—worst.
Blister size increases as follows: 2 > 4 > 6 > 8.
Density of blisters designated as follows: F = few; M = medium; MD = medium dense; D = dense.

EXAMPLES 7–13

These Examples provide a comparison of the effectiveness of the ARANOX antioxidant to various other phenylenediamine-containing compounds as anticorrosion pigments when added to a standard epoxy or polyurethane primer coating formulation.

Several phenylenediamine-containing antioxidant compounds were tested as potential anticorrosion pigments in standard melamine-cured epoxy resin or in isocyanate-crosslinked polyester-polyol. In these Examples, the test primer formulations were applied to zinc-aluminum-clad steel panels, which were topcoated and scribed before being exposed to salt spray corrosion testing. After exposure the panels were ranked for their evident resistance to corrosion, samples with better anticorrosion performance were given higher numbers.

The formulations at test included the following as candidate pigments: (7) 4-aminodiphenylamine (4-ADPA); (8) SANTOFLEX 44PD antioxidant; (9) m-xylene diamine; (10) polyaniline, emeraldine base (PANI-EB); and (11) ARANOX antioxidant. Also included as control formulations were: (12) binder resin with no added corrosion inhibiting pigment and (13) binder resin with chromate corrosion inhibiting pigment.

The epoxy formulations comprised 93.5 grams advanced epoxy resin, 7.8 grams melamine, 17.3 grams inert pigment, and 41.1 grams of test anticorrosion pigment. The polyurethane formulations comprised 93 grams polyester resin, 13.9 grams isocyanate, 24.7 grams inert pigment, and 63.9 grams anticorrosion pigment. The primer formulations were bar-coated on zinc-aluminum clad steel, and oven-cured to peak metal temperature 465° F. Samples were subsequently top-coated with a standard white polyester paint and scribed. After 1000 hours salt fog exposure (ASTM B117), the samples were ranked for overall appearance.

The panels were rated in the following way: on a scale of 0 to 10, where 10 indicated excellent performance, blister and rust formation near the scribe, at the edge of the panel, and in the field between scribe and edge were evaluated. Sums of the three ratings (scribe, and field) for the panels containing the tested additives are compared to the corresponding ratings of control panels. The results, indicating relative anticorrosion performance of phenylene-diamine based anticorrosion pigments in epoxy or urethane formulations, are indicated in the following Tables:

1000 Hour Salt Fog Results Epoxy Formulations

| Additive | Numerical Rating |
|---|---|
| Chromate (control) | 29 |
| Inert (control) | 29 |
| ARANOX antioxidant | 21 |
| PANI-EB | 10 |
| m-xylene diamine | 25 |
| SANTOFLEX 44PD antioxidant | 15 |
| 4-ADPA | 14 |

1000 Hour Salt Fog Results Polyurethane Formulations

| Additive | Numerical Rating |
|---|---|
| Chromate (control) | 29 |
| Inert (control) | 2 |
| ARANOX antioxidant | 8 |
| PANI-EB | 26 |
| m-xylene diamine | 22 |
| SANTOFLEX 44PD antioxidant | 7 |
| 4-ADPA | 5 |

These data illustrate that an epoxy resin itself has fully acceptable performance on zinc-aluminum clad steel under the test conditions and does not need corrosion resistant additives that might function under similar test conditions, as previously shown in Example 5, for Example on untreated steel. In contrast, the performance of a polyurethane coating, even when placed on zinc-aluminum clad steel, was enhanced by the present invention as compared to the inert control, the use of the SANTOFLEX 44PD brand additive, and the use of 4-ADPA.

The foregoing Examples, since they are presented to merely illustrate certain embodiments of the present invention, should not be construed in a limiting sense. The scope of protection sought is set forth in the claims that follow.

We claim:

1. A method of protecting a metal article from corrosion under prolonged exposure to ambient atmospheric conditions which cause such corrosion by treating the metal article with an effective amount of one or more hydrocarbyl-substituted sulfonyl amido diphenylamine compounds for the corrosion protection of the metal article, by either (a) treating the metal alone with at least one such compound, (b) treating the metal with a solvent solution of at least one such compound, or (c) by placing at least one such compound in an adherent organic resinous barrier coating on the metal yb applying a composition consisting essentially of organic resin and compound in a solvent to the metal.

2. A method as claimed in claim 1 wherein the compound has the formula p-(R—$SO_2$—NH)—$C_6H_4$—NH—$C_6H_5$ where R is an hydrocarbyl group selected from the group consisting of alkyl, aryl, alkaryl, aralkyl, alkenyl, and cycloalkyl.

3. A method as claimed in claim 2 wherein the compound is p-(p-toluene sulfonyl amido)-diphenylamine.

4. A method as claimed in claim 1 wherein the compound is present at from about 0.1% to about 20%, by weight, in the adherent organic resin.

5. A method as claimed in claim 4 wherein the compound has the formula p-(R—$SO_2$—NH)—$C_6H_4$—NH—$C_6H_5$ where R is an hydrocarbyl group selected from the group consisting of alkyl, aryl, alkaryl, aralkyl, alkenyl, and cycloalkyl.

6. A method as claimed in claim 4 wherein the compound is p-(p-toluene sulfonyl amido)-diphenylamine.

7. A corrosion resistant metal article produced by the process of claim 1.

8. A corrosion resistant metal article produced by the process of claim 2.

9. A corrosion resistant metal article produced by the process of claim 3.

10. A corrosion resistant metal article produced by the process of claim 4.

11. A corrosion resistant metal article produced by the process of claim 5.

12. A corrosion resistant metal article produced by the process of claim 6.

* * * * *